United States Patent
Huang et al.

(10) Patent No.: US 7,061,487 B2
(45) Date of Patent: Jun. 13, 2006

(54) METHOD AND APPARATUS FOR IMPROVING DEPTH INFORMATION COMMUNICATION BANDWIDTH IN A COMPUTER GRAPHICS SYSTEM

(75) Inventors: Hung-Ju Huang, Hsinchu (TW); Chung-Yen Lu, Taipei (TW); Yung-Ching Chang, Kaohsiung Hsien (TW)

(73) Assignee: Silicon Integrated Systems Corp., Hsin Chu (TW)

( * ) Notice: Subject to any disclaimer, the term of this patent is extended or adjusted under 35 U.S.C. 154(b) by 381 days.

(21) Appl. No.: 10/405,639

(22) Filed: Apr. 3, 2003

(65) Prior Publication Data

US 2004/0196284 A1    Oct. 7, 2004

(51) Int. Cl.
*G06T 15/40* (2006.01)
(52) U.S. Cl. ..................................... 345/422
(58) Field of Classification Search ............... None
See application file for complete search history.

(56) References Cited

U.S. PATENT DOCUMENTS 4,961,153 A * 10/1990 Fredrickson et al. ........ 345/422
5,029,105 A * 7/1991 Coleman et al. ............ 345/539
5,990,904 A * 11/1999 Griffin ........................ 345/631
6,057,852 A * 5/2000 Krech, Jr. ................... 345/589

OTHER PUBLICATIONS

Foley et al. Computer Graphics: Principles and Practice. Addison-Wesley Publishing Company, Inc. 1997. p. 668-672.*

* cited by examiner

*Primary Examiner*—U. Chauhan
*Assistant Examiner*—Peter-Anthony Pappas
(74) *Attorney, Agent, or Firm*—Birch, Stewart, Kolasch & Birch, LLP

(57) ABSTRACT

A method and apparatus for improving bandwidth for depth information communication in a computer graphics system. In operation, a decoder checks a type table associated with a collection of pixels in a memory unit in response to a request for depth information with respect to the collection of pixels. If the type table indicates that the depth information with respect to the collection of pixels has been encoded previously, the decoder computes depth values corresponding to the collection of pixels for each visible polygon in accordance with respective sets of plane parameters in a parameter record associated with a plane pattern, and reconstructs the depth information from the depth values for each visible polygon in accordance with the plane pattern. When the collection of pixels is modified by a new polygon, an encoder updates the plane pattern, the parameter record, and the type table in the memory unit.

11 Claims, 8 Drawing Sheets

|   | $Z_0$ | $\Delta Z_X$ | $\Delta Z_Y$ |
|---|---|---|---|
| 0 | 0 | 0 | 0 |
| 1 | 10 | +2 | -1 |
| 2 | 5 | 0 | +3 |
| 3 | 12 | +1 | +1 |

720

→

|   | $Z_0$ | $\Delta Z_X$ | $\Delta Z_Y$ |
|---|---|---|---|
| 0 | 0 | 0 | 0 |
| 1 | 5 | 0 | +3 |
| 2 | 12 | +1 | +1 |

| 3 | 0 | 0 | 0 |
|---|---|---|---|
| 3 | 3 | 0 | 2 |
| 3 | 3 | 3 | 2 |
| 3 | 3 | 3 | 3 |

→

712

| 2 | 0 | 0 | 0 |
|---|---|---|---|
| 2 | 2 | 0 | 1 |
| 2 | 2 | 2 | 1 |
| 2 | 2 | 2 | 2 |

| 12 | 0 | 0 | 0 |
|---|---|---|---|
| 13 | 14 | 0 | 8 |
| 14 | 15 | 16 | 11 |
| 15 | 16 | 17 | 18 |

FIG. 7C

METHOD AND APPARATUS FOR IMPROVING DEPTH INFORMATION COMMUNICATION BANDWIDTH IN A COMPUTER GRAPHICS SYSTEM

BACKGROUND OF THE INVENTION

1. Field of the Invention

The invention relates to computer graphics rendering and display. More particularly, the invention relates to a method and apparatus for improving a bottleneck in the data communication between a raster engine and a depth buffer in a computer graphics system.

2. Description of the Related Art

Three-dimensional (3D) objects are commonly represented in computer graphics applications as an approximation of their surface via a sufficiently large number of polygons, such as triangles. Typically, a 3D computer graphics system has two main functions, that is, geometric processing and rasterizing. Geometric calculations such as transformation, light modeling, clipping and perspective projection are executed in a geometry engine. In converting from a 3D representation of an image to a two-dimensional (2D) representation, many calculations of color values and hidden surface removal are executed in a raster engine.

One of the most widely used hidden surface removal algorithms is the depth-buffer routine. This routine determines which points on which polygons are closest to the viewer for every pixel on the screen. It requires a frame buffer in which color values are stored, and a Z-buffer, with the same number of entries, in which a Z-value (depth value, e.g. a measure of the distance to the viewer) is stored for each pixel of a scene. The frame buffer is initialized to the background color. A Z-buffer 100 is initialized to zero representing the Z-value at the back clipping plane, as illustrated in FIG. 1A. The largest value that can be stored in the Z-buffer 100 represents the Z-value of the front clipping plane. During the scan conversion process, if the polygon point being scan-converted at a given pixel on the screen is no farther from the viewer than the point whose color and depth are currently in the frame buffer (not shown) and the Z-buffer 100, respectively, then the color and depth of the new points replace the old values, as illustrated in FIG. 1B.

In 3D graphics processing for hidden surface removal, the raster engine requires at least one read access to the Z-buffer 100 and one comparison of the old and new Z-values for each pixel. Depending on the comparison, the raster engine performs write access to the Z-buffer 100 whereby it can update the Z-buffer 100 with the new Z-values. The advantage of the above-described process is that polygons which belong to any object can be rendered in arbitrary order independent of their depth. However, the use of the depth-buffer routine requires a large amount of data to be communicated between a raster engine and a Z-buffer or depth-buffer, and the performance of a computer graphics system is degraded by a bottleneck phenomenon in the data communication. There exists a bandwidth problem during Z-buffer access.

Accordingly, what is needed is a reduced amount of depth information to be transferred during depth-buffer access. The present invention addresses such a need.

SUMMARY OF THE INVENTION

It is an object of the present invention to provide a method and apparatus for improving a bandwidth problem caused by a depth-buffer bottleneck in a computer graphics system.

The present invention is generally directed to a method for improving bandwidth for depth information communication in a computer graphics system. According to one aspect of the invention, when a collection of pixels is modified by a new polygon, a set of plane parameters for the new polygon is obtained and one or more modified pixels in the collection of pixels are also is marked. With respect to the collection of pixels, prior depth information is checked to see whether it has been encoded previously or not. If the prior depth information is encoded, then the following steps are performed. The first step is to retrieve a plane pattern and a parameter record for the prior depth information with respect to the collection of pixels from a storage area. Next, a new plane number is assigned to a location in the plane pattern, in which the assigned location corresponds to the modified pixel in the collection of pixels. In addition, the set of plane parameters for the new polygon is appended to the parameter record associated with the plane pattern. Whether new depth information with respect to the collection of pixels modified by the new polygon is worth encoding or not is determined now. If it is worth encoding, the plane pattern and the parameter records that are updated to encode the new depth information are written back to the storage area. Also, a type table associated with the collection of pixels is updated in order to indicate a total number of effective plane parameter sets stored in the parameter record.

According to another aspect of the invention, upon receipt of a request for depth information with respect to a collection of pixels, a type table associated with the collection of pixels is read first and is examined to determine whether the depth information with respect to the collection of pixels has been encoded previously. If the depth information is encoded, then the following steps are performed. The first step is to fetch a plane pattern and a parameter record associated with the plane pattern from a storage area. Thereafter, depth values corresponding to the collection of pixels for each visible polygon are computed based on respective plane parameter sets in the parameter record. Note that each set of plane parameters for the visible polygon includes an initial depth value of the corresponding visible polygon for the collection of pixels, a first and second depth slope value of the corresponding visible polygon in which the first depth slope value is in respect of a first direction and the second depth slope value is in respect of a second direction. In accordance with the plane pattern, the depth information is reconstructed from the depth values for each visible polygon. The reconstructed depth information is provided for further process. However, if the depth information has not been encoded it is provided directly.

In one embodiment of the present invention, an apparatus for improving bandwidth for depth information communication in a computer graphics system is disclosed. The apparatus of the invention includes a memory unit, a decoder and an encoder. The memory unit stores a number of type tables associated with corresponding collections of pixels. The decoder is coupled to the memory unit and provides depth information according to a type table associated with a collection of pixels. If the type table associated with the collection of pixels indicates that the depth information has been encoded previously, the decoder fetches a plane pattern and a parameter record associated with the plane pattern from a storage area and reconstructs the depth information with respect to the collection of pixels based on the plane pattern and the parameter record. In addition, the encoder is coupled between the memory unit and the decoder. When the collection of pixels is modified by a new polygon, the encoder updates the plane pattern, the parameter record associated with the plane pattern and the type table in the memory unit. Preferably, the apparatus also includes a cache coupled among the storage area, the decoder and the encoder, for storing recently-accessed plane patterns and parameter records in order to expedite the process of depth information.

BRIEF DESCRIPTION OF THE DRAWINGS

The present invention will be described by way of exemplary embodiments, but not limitations, illustrated in the accompanying drawings in which like references denote similar elements, and in which:

FIGS. 7A~7C are diagram illustrating an example useful in understanding the operation of the encoder.

DETAILED DESCRIPTION OF THE INVENTION

In general, a goal of 3D computer graphics is to create a 2D projection on a screen of a 3D model as viewed from a predetermined viewpoint in 3D model. A standard Z-buffer linearly associates a Z-value, representing the distance from the viewer (depth in the scene relative to a projection plane), with each pixel drawn on the screen. When a first object is projected, attributes of its pixels (such as color) are stored in a frame buffer, and the Z-value associated with each pixel is separately stored in the Z-buffer. If a second object from the model subsequently projects onto the same pixel, the new object's Z-value is compared against the Z-value already stored for that pixel, and only if the new value is larger (representing an object closer to the viewer) will the new pixel be drawn. In particular implementations, Z-values can increase with increasing depth, or can decrease with increasing depth. Since the invention is not restricted to one such implementation or the other, Z-values sometimes are referred to herein as being "farther" or "nearer" to the viewpoint than other Z-values. In order to achieve perspective-correct mapping, computer graphics systems perform projection calculations using 4×4 matrix representing the transformation to be performed. 4×4 matrix transformations depend on the representation of points in the 3D model space using "homogenous coordinates", in which a fourth coordinate, W, is added to the traditional three spatial coordinates X, Y and Z. Two sets of homogenous coordinates are considered to refer to the same point in the 3D model space if one is a multiple of the other. Thus, (X,Y,Z,W) refers to the same point as (X/W,Y/W,Z/W,1) in which representation of the fourth coordinate ("1") can be dropped. The projection calculations traditionally performed naturally yield a value 1/W for each point projected onto an image plane. It is known in the art that the value 1/W for a point is related to its depth in the scene. Because Z-values or 1/W values may represent the depth of an object in a scene, these two values can be more generally referred to as "depth information" herein.

Figure 1A:
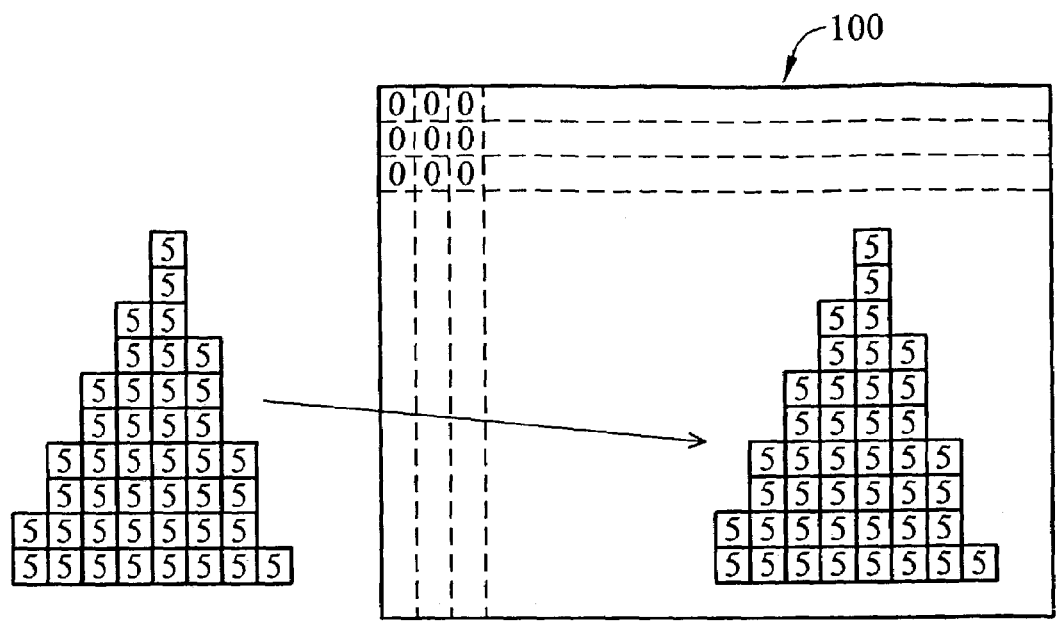
FIGS. 1A~1B are diagrams illustrating an application of the depth-buffer routine.
Figure 1B:
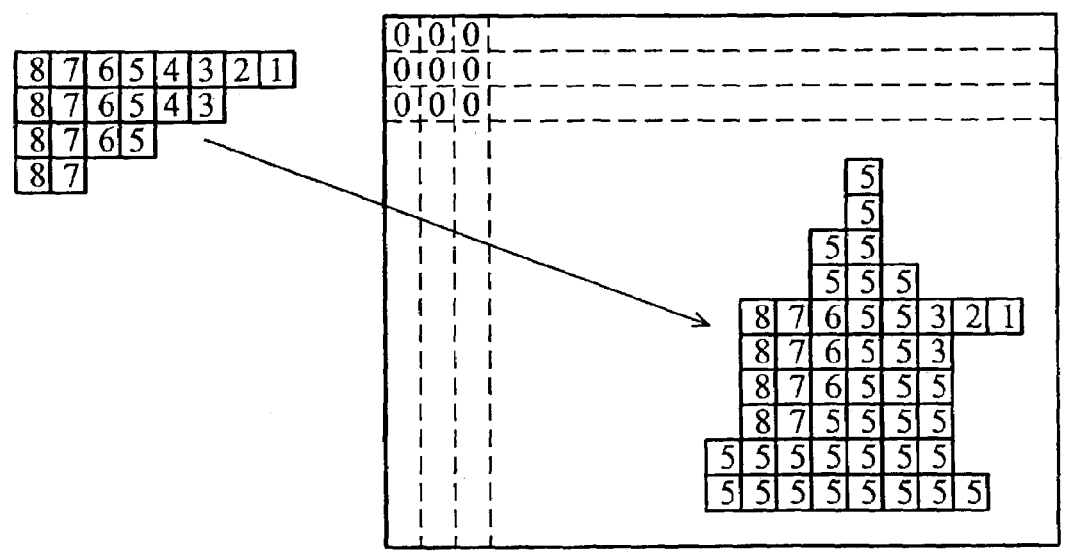
Figure 2A:
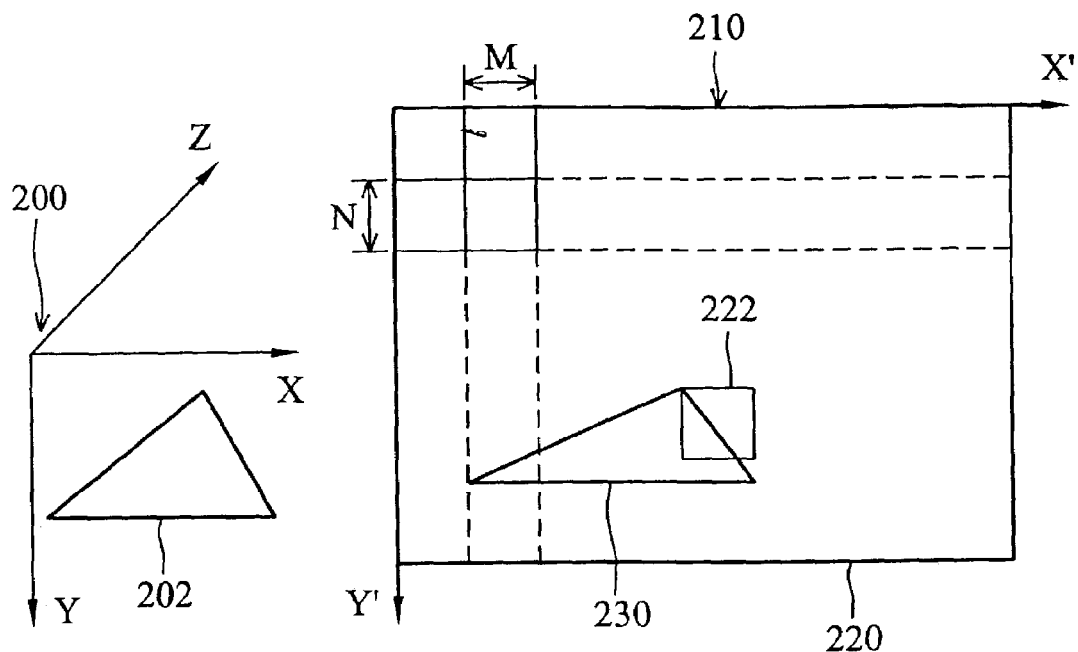
FIG. 2A is a perspective view of a projection of a triangle onto a pixel-oriented screen.
Figure 2B:
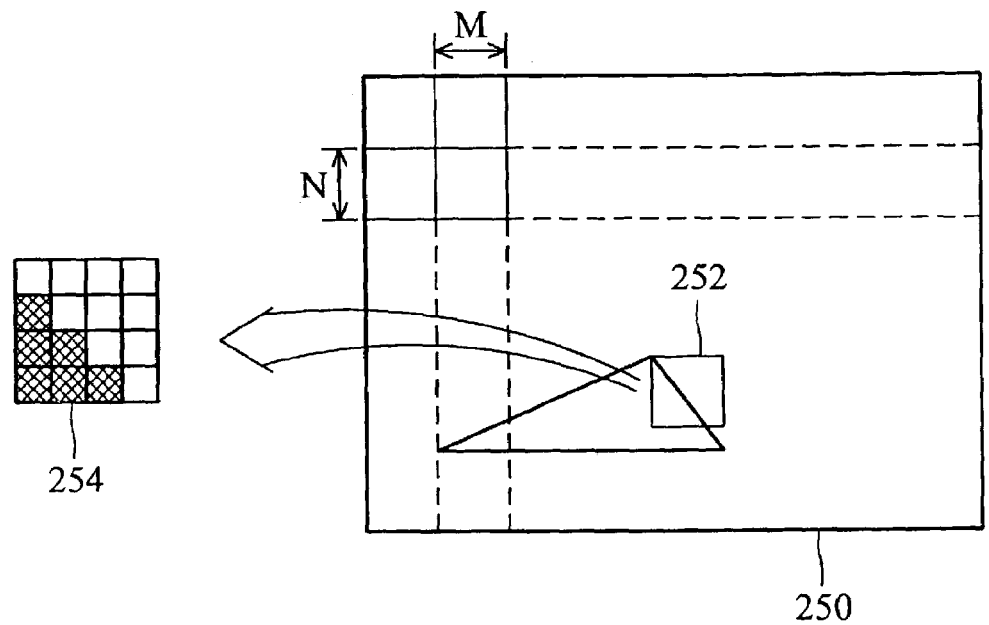
FIG. 2B is diagram depicting a Z-buffer of FIG. 2A.

According to the invention, a raster engine splits the screen into smaller tiles in which a tile is a collection of M×N pixels. By manipulating pixels in groups as tiles, the raster engine can increase efficiency of data access. For each tile the raster engine determines which polygon primitives contribute to that tile. Therefore, both the depth and frame buffers are organized as tile-based. FIG. 2A illustrates the rendering of a planar polygon 202 at a distance from a projection plane or image plane 210. The final image in the screen 220, as 5 projected onto the image plane 210, is illustrated as 230 in FIG. 2A. Note that the screen 220 is divided into a number of smaller tiles; each tile is an array of M×N pixels. FIG. 2B illustrates a Z-buffer 250 corresponding to the screen 220. As depicted, the Z-buffer 250 is also lo split into smaller units called the "Z-tiles", in which each Z-tile corresponds to the screen tile. Typically, the polygon (triangle) 202 in the model space 200 can be defined with a plane equation:

$$AX+BY+CZ+D=0$$

or $$Z = -\frac{AX + BY + D}{C}$$

If the triangle 202 is projected onto a tile 222 in the screen 220, the Z-value for each (i,j) location in a Z-tile 252 which corresponds to the tile 222 is calculated from $$Z(i, j) = Z_0 + \left(-\frac{A}{C}\right) \times i + \left(-\frac{B}{C}\right) \times j = Z_0 + \Delta Z_X \times i + \Delta Z_Y \times j$$

where $Z_0$ is an initial depth value for the origin (0,0) in the Z-tile 252, $\Delta Z_x$ is a depth slope value of the polygon 202 in the X direction, and $\Delta Z_y$ is a depth slope value of the polygon 202 in the Y direction. $Z_0$, $\Delta Z_x$ and $\Delta Z_y$ are herein referred to as a set of plane parameters for a polygon and its corresponding Z-tile. It is possible that two or more polygons are drawn to the same Z-tile. Therefore, each Z-tile is provided with a plane pattern to indicate which location of the Z-tile keeps a Z-value for which polygon. As illustrated in FIG. 2B, the Z-tile 252 accompanies a plane pattern 254. With the plane patterns and the plane parameter sets, the depth information with respect to all tiles of a screen can be encoded and decoded according to the invention.

Figure 3:
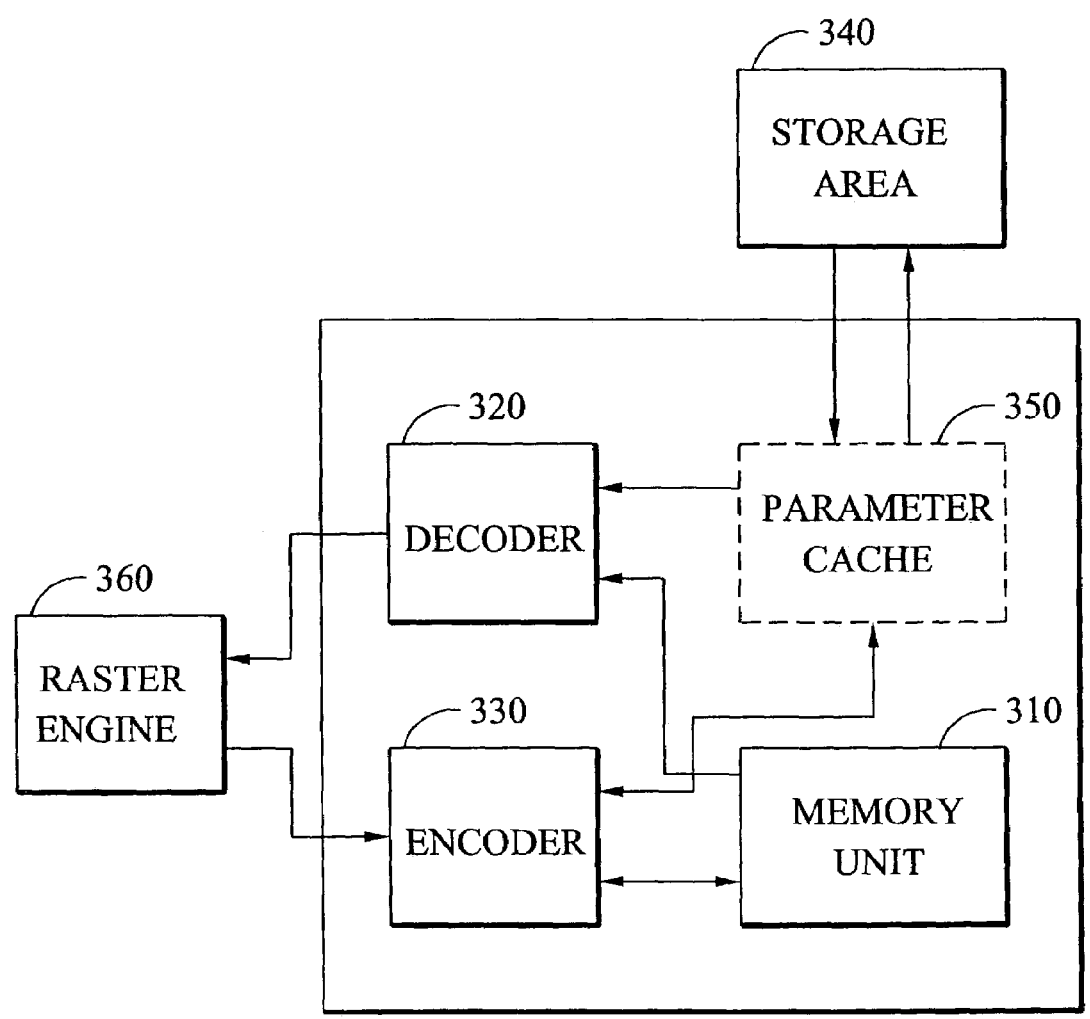
FIG. 3 is a block diagram of a preferred embodiment in accordance with the invention.

In a preferred embodiment of FIG. 3, a memory unit 310 stores a plurality of type tables associated with tiles in the screen. Each type table associated with a tile may represent K values. In one embodiment, the value 0 indicates that the tile is drawn only with one polygon, and the value 1 indicates that the tile is drawn with two polygons, and so forth. Particularly, the value K−1 indicates that a Z-tile corresponding to the tile is not encoded. In an alternative embodiment, the value 0 indicates that a Z-tile corresponding to the tile has not been initialized yet. The value 1 indicates that the tile is drawn with one polygon, and the value 2 indicates that the tile is drawn with two polygons, and so forth. Note that the value K−1 indicates that the Z-tile corresponding to the tile is not encoded. The advantage of this embodiment is that only the type tables in the memory unit 310 are initialized during initialization phase, but the Z-tiles need not to be initialized. This results in reduction of memory accesses.

Still referring to FIG. 3, a decoder 320 is coupled to the memory unit 310 and provides depth information to a raster engine 360 in accordance with a type table. If the type table associated with a certain tile indicates that the depth information has been encoded previously, the decoder 320 fetches a plane pattern and a parameter record associated with the plane pattern from a storage area 340 and reconstructs the depth information with respect to the tile based on the plane pattern and the parameter record. In addition, an encoder 330 is coupled between the memory unit 310 and the decoder 320. When the tile is modified by a new polygon, the encoder 330 updates the plane pattern, the parameter record associated with the plane pattern and the type table in the memory unit 310. Optionally, a parameter cache 350 is coupled among the storage area 340, the decoder 320 and the encoder 330. The parameter cache 350 stores recently-accessed plane patterns and parameter records in order to expedite the process of depth information.

Figure 4:
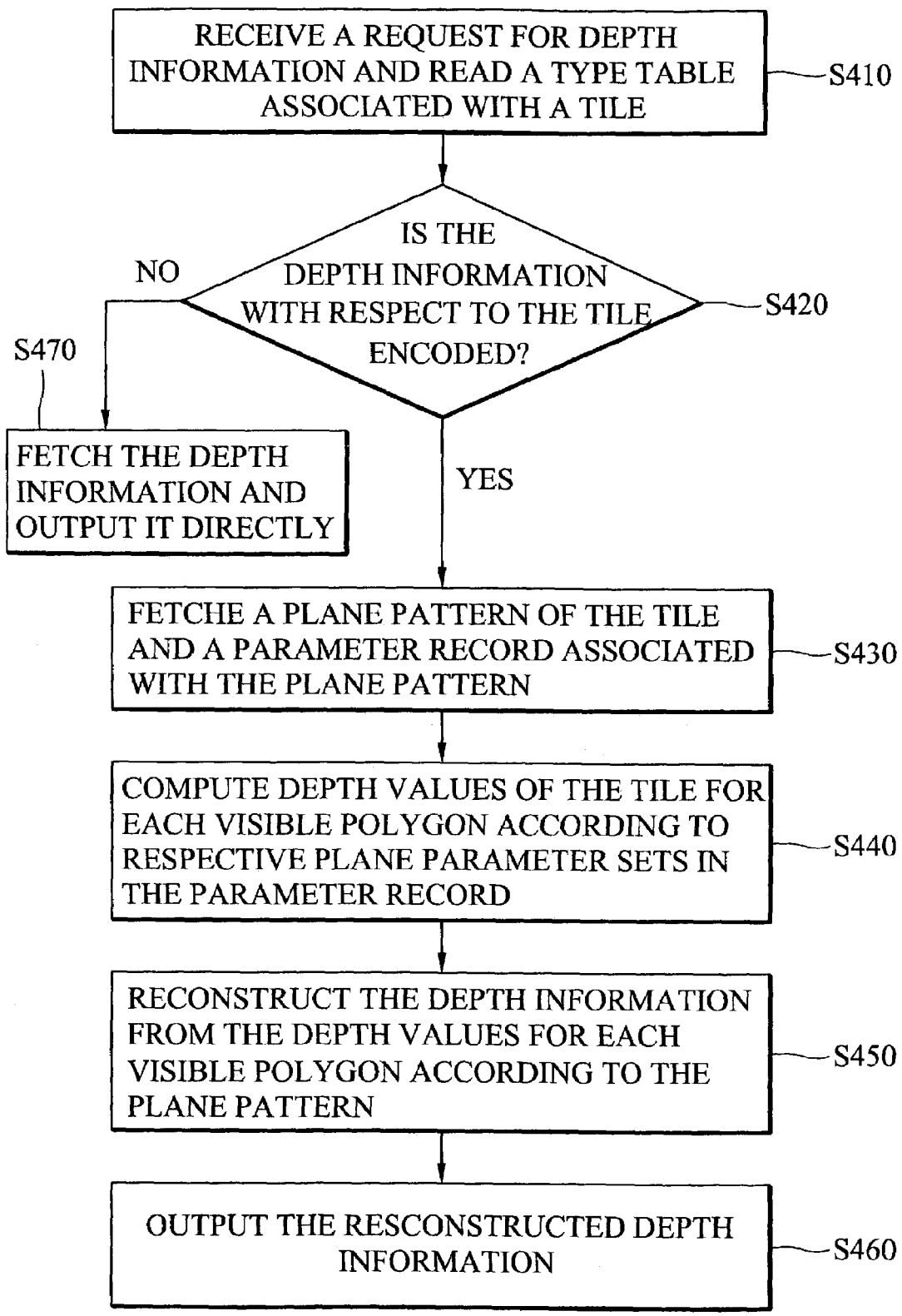
FIG. 4 is a flowchart illustrating the primary operational steps executed by a decoder of the invention.

The features of the present invention will be more clearly understood from examples taken in conjunction with the accompanying flowcharts. FIG. 4 illustrates the primary operational steps executed by the decoder 320. Once the decoder 320 receives a request for depth information with respect to a tile from the raster engine 360, it reads a type table associated with the tile from the memory unit 310 (step S410). According to the type table, the decoder 320 determines whether the depth information with respect to the tile has been encoded previously (step S420). If the type table indicates that the depth information with respect to the tile is not encoded, it proceeds to step S470 where the decoder 320 fetches the depth information from the storage area (depth buffer) 340 and sends the depth information to the raster engine 360 directly. If the depth information has been encoded previously, for instance, the type table associated with the tile indicates that the tile is drawn with two polygons (planes), the decoder 320 fetches a plane pattern of that tile and a parameter record associated with the plane pattern from the storage area 340 (step S430).

Figure 5:
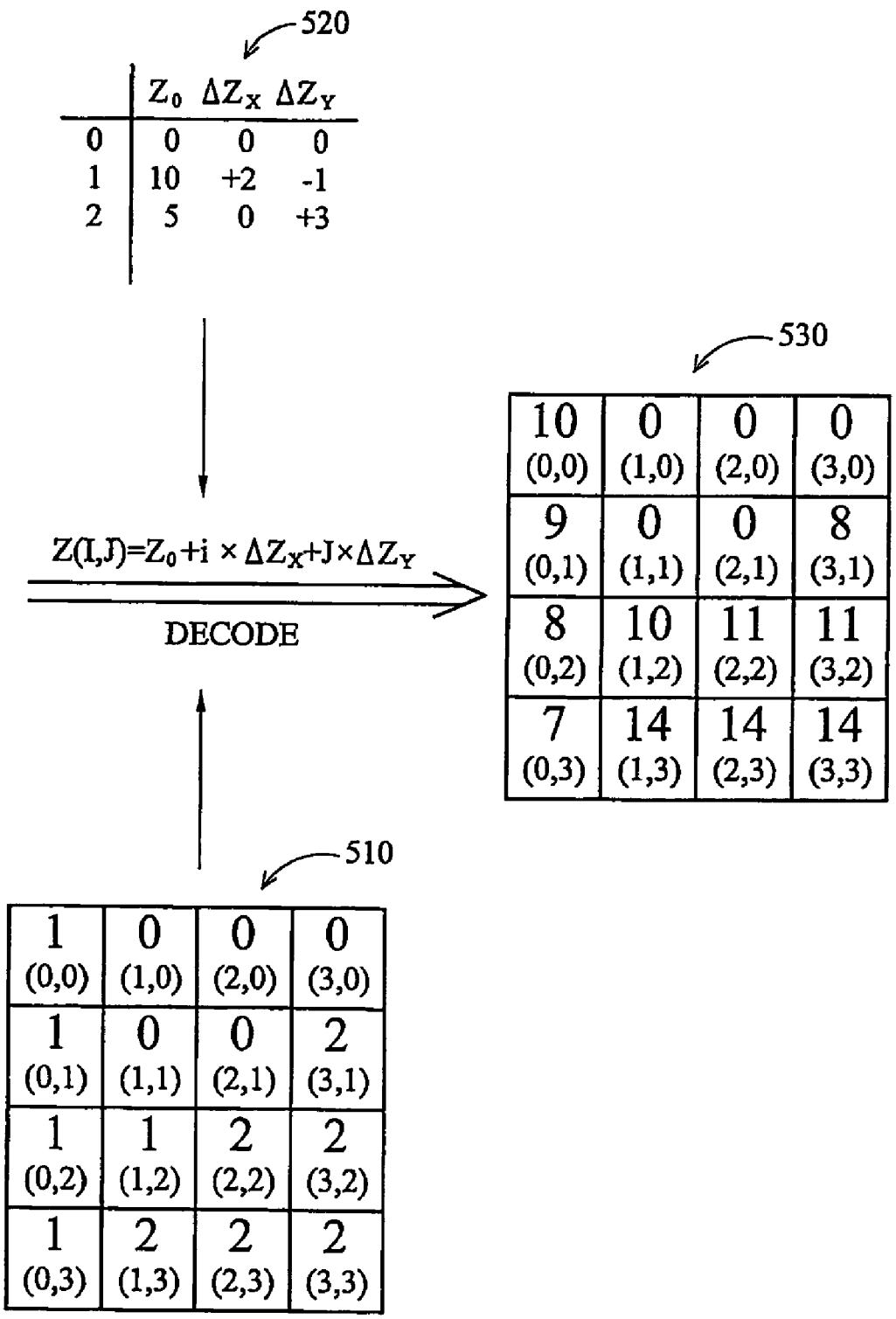
FIG. 5 is an example useful in understanding the operation of the decoder.

FIG. 5 illustrates a plane pattern 510 and a parameter record 520 associated with the plane pattern 510 as an example. Since the exemplary tile size is 4×4, the plane pattern 510 has 16 locations. In the example of FIG. 5, the parameter record 520 contains three sets of plane parameters in which the set 0 represents the back clipping plane. Each set of plane parameters is composed of $Z_0$, $\Delta Z_x$ and $\Delta Z_y$. Returning to FIG. 4, the decoder computes depth values corresponding to the tile for each visible polygon in accordance with respective plane parameter sets in the parameter record 520 (step S440). Meanwhile, the decoder 320 reconstructs the depth information from the depth values for each visible polygon in accordance with the plane pattern 510 (step S450). The reconstructed Z-tile 530 is also shown in FIG. 5. Accordingly, for each location (i,j) in that tile, the decoder 320 gets a plane number from the plane pattern 510 and gets a set of plane parameter associated with the plane number from the parameter record 520. Then, the decoder 320 calculates a depth value for each Z(i,j) as follows:

$$Z(i,j)=Z_0+\Delta Z_x \times i + \Delta Z_y \times j$$

Finally, the reconstructed depth information (Z-tile 530) is sent to the raster engine 360 (step S460)

Figure 6A:
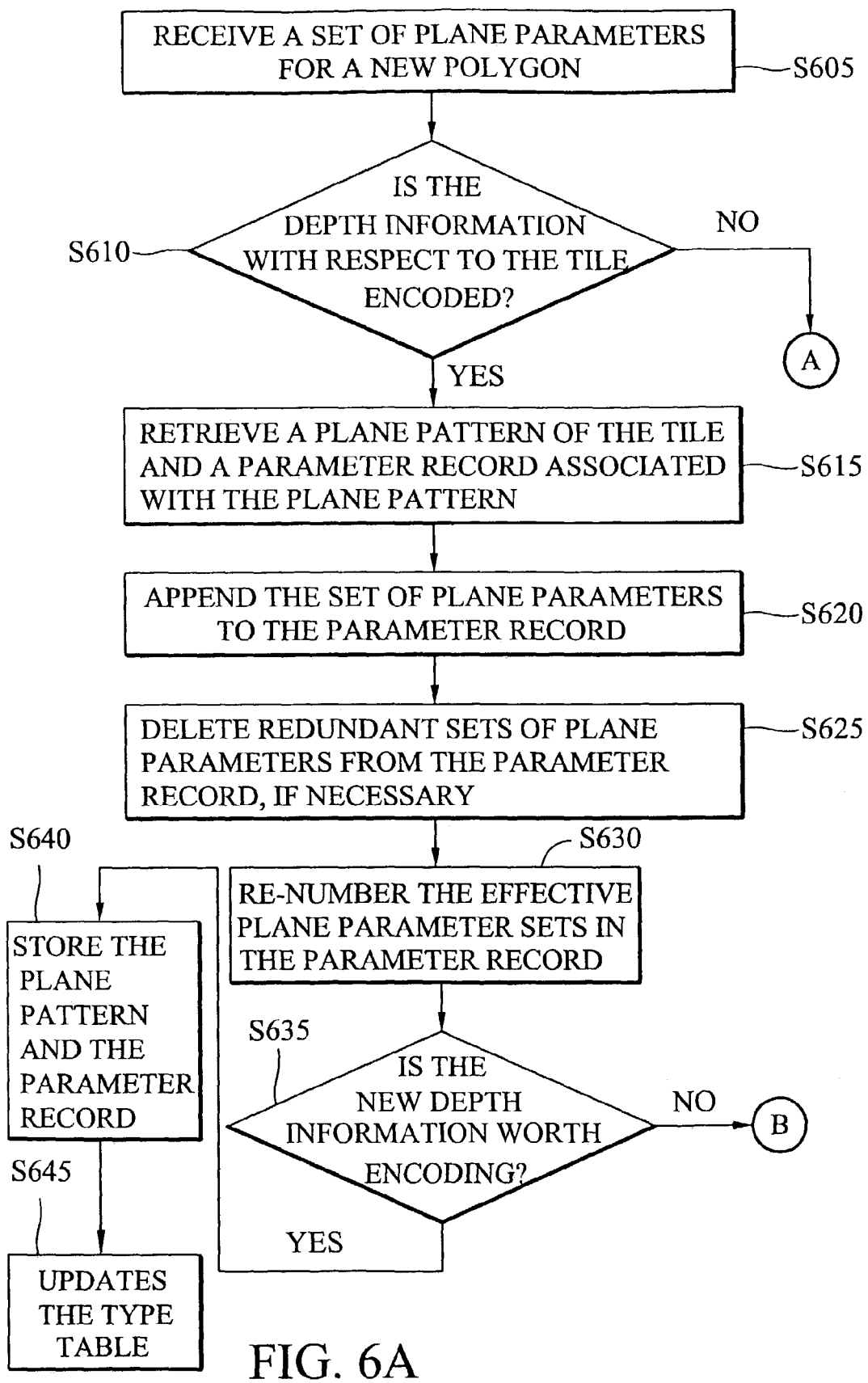
FIGS. 6A~6B are flowcharts illustrating the primary operational steps executed by an encoder of the invention.
Figure 6B:
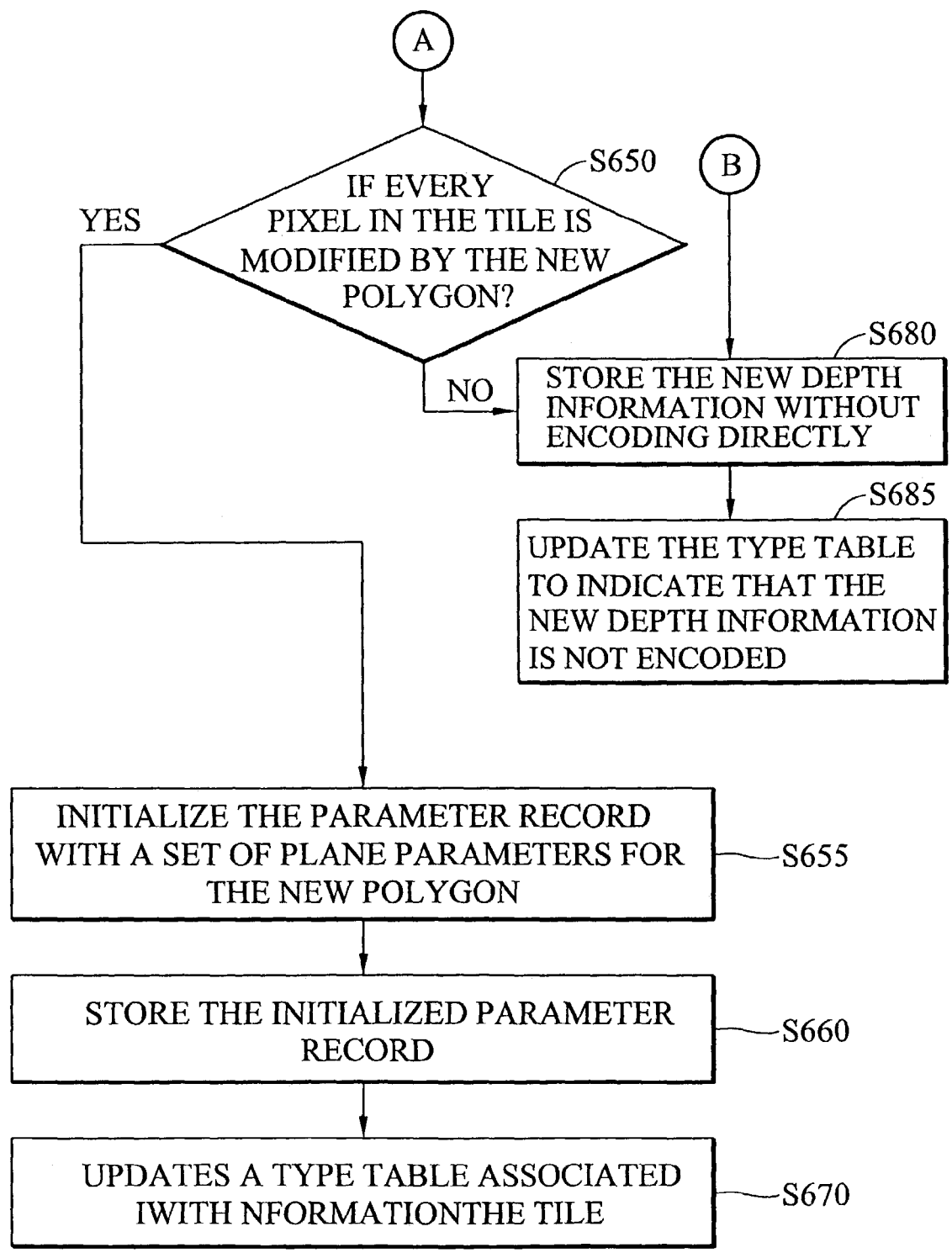

Turning now to FIGS. 6A and 6B, the primary operational steps executed by the encoder 330 are illustrated. From the raster engine 360, the encoder 330 receives a set of plane parameters for a new polygon if a tile is modified by the new polygon (step S605). At the same time, raster engine 360 indicates which pixel in the tile is modified. The encoder 330 reads a type table associated with the tile from the memory unit 310 and determines whether prior depth information with respect to the tile has been encoded previously according to the type table (step S610). The exemplary tile of FIG. 5 is illustrated here again. Therefore, the encoder 330 retrieves the plane pattern 510 and the parameter record 520 for the prior depth information with respect to that tile from the storage area 340 (step S615). The encoder 330 assigns a new plane number to one or more locations in the plane pattern 510, in which the assigned locations correspond to the modified pixels in the tile. Also, the encoder 330 appends the set of plane parameters for the new polygon (plane 3) to the parameter record 520 associated with the plane pattern 510 (step S620). FIGS. 7A and 7B illustrate a plane pattern 710 modified from the plane pattern 510 and a parameter record 720 modified from the parameter record 520. A modified Z-tile 730 for the tile is also shown in FIG. 7C.

Because the new polygon (plane 3) completely covers a prior polygon (plane 1) represented by the plane parameter set 1 of the parameter record 720 within the tile, the plane parameter set 1 becomes a redundant set of plane parameters. Thus, the redundant set of plane parameters is deleted from the parameter record 720 associated with the plane pattern 710 (step S625). The effective plane parameter sets including the set of plane parameters for the new polygon in the parameter record 720 are now re-numbered with minimum numbers (step S630). The plane pattern 710 changes together at the same time. The resulting plane pattern 712 and parameter record 722 after the operations are shown in FIG. 7. Thereafter, the encoder 330 evaluates the total number of the effective plane parameter sets stored in the parameter record 722 and determines if new depth information with respect to the tile modified by the new polygon is worth encoding (step S635). In this regard, bits required to encode depth information may exceed the original bits without encoding if there are too many visible polygons within a tile. Therefore, the encoder 330 sets a predetermined number as a threshold for the total number of visible polygons in a tile. If the total number of the effective plane parameter sets is beyond the predetermined number, then the new depth information need not be encoded and it proceeds to step S680 where the encoder 330 directly stores the new depth information (Z-tile) without encoding to the storage area 340. Meanwhile, the encoder 330 updates the type table associated with that tile to indicate that the new depth information is not encoded (step S685).

If the new depth information with respect to the tile deserves to be encoded, the encoder 330 stores the plane pattern 712 and the parameter record 722 that are updated to encode the new depth information back to the storage area 340 (step S640). Meanwhile, the encoder 330 updates the type table associated with that tile to indicate the total number of effective plane parameter sets in the parameter record 722 (step S645). The compression gains versus various tile sizes and the number of polygons within a tile are listed in Table 1. Note that $Z_0$, $\Delta Z_x$ and $\Delta Z_y$ are represented by 32-bit floating point format, depth information is accessed in a unit of 32 bits, and each value in the plane pattern is coded with 2 bits.

TABLE 1

| | Compression Gain | | | |
|---|---|---|---|---|
| Tile size | One plane | Two planes | Three planes | Four planes |
| 4 × 4 | 4.00 | 2.29 | 1.60 | 1.23 |
| 4 × 8 | 6.40 | 4.00 | 2.91 | 2.29 |
| 8 × 8 | 9.14 | 6.40 | 4.92 | 4.00 |

If prior depth information is not encoded previously, referring to FIG. 6B, the encoder 330 determines if every pixel in the tile is modified by the new polygon (step S650). If so, the encoder 330 initializes the parameter record with the set of plane parameters for the new polygon (step S655). The initialized parameter record is stored back to the storage area 340 (step S660), and the type table associated with the tile is updated to indicate that there exists one plane parameter set in the parameter record for the new polygon (step S670). If not all of pixels in the tile are modified, however, it proceeds to step S680 where the encoder 330 outputs the new depth information directly. This means that the total number of visible polygons in the tile has already exceeded the predetermined number.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for improving bandwidth for depth information communication in a computer graphics system, comprising the steps of:
obtaining a set of plane parameters for a new polygon if a collection of pixels is modified by the new polygon and indicating which pixel in the collection of pixels is modified;
determining if prior depth information with respect to the collection of pixels has been encoded previously;
if the prior depth information is encoded, then performing the steps of:
retrieving a plane pattern and a parameter record for the prior depth information with respect to the collection of pixels from a storage area;
assigning a new plane number to a location in the plane pattern, in which the assigned location corresponds to the modified pixel in the collection of pixels;
appending the set of plane parameters for the new polygon to the parameter record associated with the plane pattern, wherein the set of plane parameters for the new polygon comprises an initial depth value of the new polygon for the collection of pixels, and a first and second depth slope value of the new polygon in which the first depth slope value is in respect of a first direction and the second depth slope value is in respect of a second direction;
determining if new depth information with respect to the collection of pixels modified by the new polygon is worth encoding;
if the new depth information with respect to the collection of pixels is worth encoding, then performing the steps of:
storing the plane pattern and the parameter records that are updated to encode the new depth information back to the storage area;
updating a type table associated with the collection of pixels to indicate a total number of effective plane parameter sets stored in the parameter record;
deleting a redundant set of plane parameters from the parameter record associated with the plane pattern if the new polygon completely covers a prior polygon represented by the redundant set of plane parameters within the collection of pixels; and
re-numbering the effective plane sets in the parameter record associated with the plane pattern including the set of plane parameters for the new polygon, wherein the determining step of encoding comprises:
evaluating the total number of the effective plane parameter sets stored in the parameter record associated with the plane pattern; and
determining that the new depth information need not be encoded if the total number of the effective plane parameter sets is beyond a predetermined number.

2. The method as recited in claim 1 further comprising the steps of:
if the new depth information with respect to the collection of pixels need not be encoded, then performing the steps of:
storing the new depth information with respect to the collection of pixels modified by the new polygon to the storage area; and
updating the type table associated with the collection of pixels to indicate that the new depth information is not encoded.

3. The method as recited in claim 2 further comprising the steps of:
if the prior depth information is not encoded, then performing the steps of:
determining if every pixel in the collection of pixels is modified by the new polygon;
if every pixel in the collection of pixels is modified by the new polygon, then performing the steps of:
initializing the parameter record with the set of plane parameters for the new polygon;
storing the initialized parameter record back to the storage area; and
updating the type table associated with the collection of pixels to indicate that there exists one plane parameter set in the parameter record for the new polygon.

4. The method as recited in claim 3 further comprising the steps of:
if a request for the new depth information with respect to the collection of pixels is received, then performing the steps of:
reading the type table associated with the collection of pixels;
determining if the new depth information with respect to the collection of pixels has been encoded previously in accordance with the type table;
if the new depth information is encoded, then performing the steps of:
fetching the plane pattern and the parameter record associated with the plane pattern from the storage area;
computing depth values corresponding to the collection of pixels for each visible polygon in accordance with the respective plane parameter sets in the parameter record; and reconstructing the new depth information from the depth values for each visible polygon in accordance with the plane pattern.

5. A method for improving bandwidth for depth information communication in a computer graphics system, comprising the steps of:
receiving a request for depth information with respect to a collection of pixels;
reading a type table associated with the collection of pixels;
determining if the depth information with respect to the collection of pixels has been encoded previously in accordance with the type table;
if the depth information is encoded, then performing the steps of:
fetching a plane pattern and a parameter record associated with the plane pattern from a storage area;
computing depth values corresponding to the collection of pixels for each visible polygon in accordance with respective plane parameter sets in the parameter record, wherein each set of plane parameters for the visible polygon comprises an initial depth value of the corresponding visible polygon for the collection of pixels, a first and second depth slope value of the corresponding visible polygon in which the first depth slope value is in respect of a first direction and the second depth slope value is in respect of a second direction;
reconstructing the depth information from the depth values for each visible polygon in accordance with the plane pattern;
sending the reconstructed depth information;
sending the depth information if the depth information is not encoded;
obtaining a new set of plane parameters for a new polygon if the collection of pixels is modified by the new polygon and indicating which pixel in the collection of pixels is modified;
determining if the depth information with respect to the collection of pixels modified by the new polygon has been encoded previously;
if the depth information is encoded, then performing the steps of:
retrieving the plane pattern and the parameter record for the depth information with respect to the collection of pixels from the storage area;
assigning a new plane number to a location in the plane pattern, in which the assigned location corresponds to the modified pixel in the collection of pixels;
appending the new set of plane parameters for the new polygon to the parameter record associated with the plane pattern;
determining if new depth information with respect to the collection of pixels modified by the new polygon is worth encoding;
if the new depth information with respect to the collection of pixels is worth encoding, then performing the steps of:
storing the plane pattern and the parameter records that are updated to encode the new depth information back to the storage area; and
updating the type table associated with the collection of pixels to indicate a total number of effective plane parameter sets stored in the parameter record;
deleting a redundant set of plane parameters from the parameter record associated with the plane pattern if the new polygon completely covers a prior polygon represented by the redundant set of plane parameters within the collection of pixels; and
re-numbering the effective plane sets in the parameter record associated with the plane pattern including the new set of plane parameters for the new polygon, wherein the determining step of encoding comprises:
evaluating the total number of the effective plane parameter sets stored in the parameter record associated with the plane pattern; and
determining that the new depth information need not be encoded if the total number of the effective plane parameter sets is beyond a predetermined number.

6. The method as recited in claim 5 further comprising the steps of:
if the new depth information with respect to the collection of pixels need not be encoded, then performing the steps of:
storing the new depth information with respect to the collection of pixels modified by the new polygon to the storage area; and
updating the type table associated with the collection of pixels to indicate that the new depth information is not encoded.

7. The method as recited in claim 6 further comprising the steps of:
if the depth information with respect to the collection of pixels modified by the new polygon is not encoded, then performing the steps of:
determining if every pixel in the collection of pixels is modified by the new polygon;
if every pixel in the collection of pixels is modified by the new polygon, then performing the steps of:
initializing the parameter record with the new set of plane parameters for the new polygon;
storing the parameter record that is updated to encode the new depth information back to the storage area; and
updating the type table associated with the collection of pixels to indicate that there exists one plane parameter set in the parameter record.

8. An apparatus for improving bandwidth for depth information communication in a computer graphics system, comprising:
a memory unit for storing a type table associated with a collection of pixels;
a decoder coupled to the memory unit, providing depth information according to the type table associated with the collection of pixels, for reconstructing the depth information with respect to the collection of pixels based on a plane pattern and a parameter record associated with the plane pattern if the type table associated with the collection of pixels indicates that the depth information has been encoded previously, and fetching the plane pattern and the parameter record from a storage area if the depth information is encoded with the plane pattern and the parameter record, wherein the storage area stores the depth information if the depth information has not been encoded preciously, the parameter record comprises a set of plane parameters for a visible polygon within the collection of pixels, and the set of plane parameters comprises an initial depth value of the visible polygon for the collection of pixels, a first and second depth slope value of the visible polygon in which the first depth slope value is in respect of a first direction and the second depth slope value is in respect of a second direction; and an encoder coupled between the memory unit and the decoder, for updating the plane pattern, the parameter record associated with the plane pattern, and the type table in the memory unit when the collection of pixels is modified by a new polygon, wherein the encoder writes new depth information with respect to the collection of pixels modified by the new polygon into the storage area if the encoder determines that the new depth information need not be encoded and updates the type table associated with the collection of pixels to indicate that the new depth information is not encoded.

9. The apparatus as recited in claim 8 wherein the decoder computes depth values corresponding to the collection of pixels for the visible polygon in accordance with the set of plane parameters in the parameter record associated with the plane pattern, and reconstructs the depth information from the depth values for the visible polygon in accordance with the plane pattern.

10. The apparatus as recited in claim 8 wherein the encoder assigns a new plane number to a location in the plane pattern in which the location corresponds to a modified pixel in the collection of pixels, appends a new set of plane parameters for the new polygon to the parameter record associated with the plane pattern, and updates the type table associated with the collection of pixels to indicate a total number of effective plane parameter sets stored in the parameter record if the encoder determines that new depth information with respect to the collection of pixels modified by the new polygon is worth encoding.

11. The apparatus as recited in claim 8 further comprising a cache coupled among the storage area, the decoder and the encoder, for storing recently-accessed plane pattern and parameter record.

* * * * *